US011843717B2

(12) United States Patent
Chavez et al.

(10) Patent No.: US 11,843,717 B2
(45) Date of Patent: Dec. 12, 2023

(54) HIGHLY SCALABLE CONTACT CENTER WITH AUTOMATED TRANSITION FROM VOICE INTERACTION

(71) Applicant: Avaya Management L.P., Santa Clara, CA (US)

(72) Inventors: David Chavez, Broomfield, CO (US); Joaquin Omar Alvarado, Eatontown, NJ (US)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 17/038,172

(22) Filed: Sep. 30, 2020

(65) Prior Publication Data

US 2022/0103684 A1 Mar. 31, 2022

(51) Int. Cl.
*H04M 3/493* (2006.01)
*H04M 3/51* (2006.01)

(52) U.S. Cl.
CPC ......... *H04M 3/493* (2013.01); *H04M 3/5166* (2013.01); *H04M 3/5191* (2013.01)

(58) Field of Classification Search
CPC ... H04M 3/493; H04M 3/5166; H04M 3/5191
See application file for complete search history.

(56) References Cited

U.S. PATENT DOCUMENTS

| | | | | |
|---|---|---|---|---|
| 6,690,788 B1 * | 2/2004 | Bauer | ................. | H04M 3/5233 379/265.09 |
| 7,324,633 B2 * | 1/2008 | Gao | ....................... | G06F 3/016 709/227 |
| 7,953,219 B2 * | 5/2011 | Freedman | ........... | G06Q 30/0201 379/265.09 |
| 10,476,917 B2 * | 11/2019 | Pirat | .................... | H04M 3/5141 |
| 10,747,559 B2 * | 8/2020 | Caldwell | ................ | G06F 11/079 |
| 11,017,775 B1 * | 5/2021 | Johnson | ................... | G10L 25/54 |
| 11,019,209 B2 * | 5/2021 | Paiva | ................... | H04M 3/5175 |
| 11,165,907 B1 * | 11/2021 | Kang | ................... | H04M 3/5237 |
| 11,178,080 B2 * | 11/2021 | Kulkarni | ................. | H04L 51/14 |
| 11,272,061 B2 * | 3/2022 | Frangos | ............... | G06Q 10/067 |
| 11,418,648 B2 * | 8/2022 | Erhart | ................ | H04M 3/5166 |
| 11,445,065 B1 * | 9/2022 | Jiron | .................... | H04M 3/5175 |
| 11,539,840 B2 * | 12/2022 | Koneru | ................. | H04M 3/493 |
| 2002/0147848 A1 * | 10/2002 | Burgin | ................... | G06Q 30/00 709/219 |

(Continued)

FOREIGN PATENT DOCUMENTS

EP 3316548 5/2018

OTHER PUBLICATIONS

Official Action for United Kingdom Patent Application No. GB2113908. 4, dated Mar. 1, 2022 7 pages.

(Continued)

*Primary Examiner* — Lisa Hashem
(74) *Attorney, Agent, or Firm* — Sheridan Ross P.C.

(57) ABSTRACT

Embodiments of the disclosure provide a method of operating a contact center. In some embodiments, the method includes receiving a call from a customer communication device, transitioning the call from a voice domain into a digital domain, and enabling the contact center to interact with the customer communication device in at least the digital domain after the call has been transitioned from the voice domain into the digital domain.

20 Claims, 10 Drawing Sheets

(56) References Cited

U.S. PATENT DOCUMENTS

| | | | |
|---|---|---|---|
| 2011/0211679 | A1 | 9/2011 | Mezhibovsky et al. |
| 2013/0343534 | A1* | 12/2013 | Nguyen ................ H04L 67/146 |
| | | | 379/265.09 |
| 2014/0162611 | A1* | 6/2014 | Mezhibovsky ..... H04M 3/5232 |
| | | | 455/414.1 |
| 2017/0324867 | A1 | 11/2017 | Tamblyn et al. |
| 2020/0153961 | A1* | 5/2020 | Mittal .................... H04M 3/493 |
| 2021/0297531 | A1* | 9/2021 | Karp .................... H04L 51/046 |
| 2022/0164550 | A1* | 5/2022 | Papancea ............ H04M 3/5183 |
| 2022/0232126 | A1* | 7/2022 | Naidu ................... H04L 51/214 |
| 2023/0070179 | A1* | 3/2023 | Day ..................... A61B 5/0022 |

OTHER PUBLICATIONS

Official Action for India Patent Application No. 202114043227, dated Apr. 7, 2022 6 pages.
Official Action for United Kingdom Patent Application No. GB2113908.4, dated Feb. 20, 2023 4 pages.

* cited by examiner

HIGHLY SCALABLE CONTACT CENTER WITH AUTOMATED TRANSITION FROM VOICE INTERACTION

FIELD

Embodiments of the present disclosure relate generally to communication methods and specifically to communication methods performed in a contact center.

BACKGROUND

Contact centers can often be limited in the number of contacts or service requests that they are able to process. When using voice channels in particular, a contact center is often limited in the number of voice-based contacts that can be serviced based on the number of human agents currently on staff and available. If a contact center experiences a high and unexpected number of voice calls, then customers will likely experience long wait times. This results in customer frustrations and possibly lost revenue, among other things.

BRIEF SUMMARY

Traditional contact center solutions to the above-noted shortcomings include scheduling a call back to the customer, thereby allowing the customer to hang up and wait for a call when an agent becomes available. Other solutions simply involve requiring the customer to wait until a new agent is available. Both solutions require the customer to wait for some time to have their question or issue addressed.

Asynchronous communication channels or non-voice channels, as compared to synchronous communication channels, provide scaling opportunities for a contact center because a single agent can be used to service multiple contacts simultaneously. Asynchronous communication channels also may enable a customer to have their question answered more rapidly than if they waited for an agent and a live/synchronous conversation. Some customers, however, may not initiate contact with a contact center using an asynchronous communication channel. For instance, some customers may call into a contact center simply out of habit or because they were only able to locate a customer help number. As another example, some customers may initiate a call into a contact center thinking that a real-time voice interaction is the best and most efficient way to address their issue. Regardless of the reason why a customer initiates contact on a voice channel; the customer may be better served via an asynchronous communication channel. Embodiments of the present disclosure propose a solution that enables the contact center to automatically transition a customer from a voice communication channel to a non-voice communication channel, especially in instances where the contact center understands that the customer may be better served via the non-voice channel. In any event, the customer may be provided with the option to switch from the voice communication channel to the non-voice communication channel and may be further provided with information to help inform their decision on whether or not to accept the option to switch.

Embodiments of the present disclosure propose a new type of "call" or call handling process in which a customer is allowed to initiate contact with a contact center via a voice channel and then the contact center transitions (e.g., automatically) the customer to a non-voice communication channel (e.g., a digital communication channel such as a chat, Instant Messaging (IM), Short Messaging Service (SMS), web interaction, application-based interaction, etc.). By defining this new type of "call", the contact center is more scalable and capable of handling large, unexpected, incoming call volume. Scalability is possible because many of the components used to automatically service a customer contact are designed for non-voice communication channels (e.g., chatbots) whereas human agents are more often used to service voice communication channels when a customer is unable to successfully navigate an Interactive Voice Response (IVR) or a company website. Furthermore, human agents are capable of simultaneously servicing multiple non-voice contacts whereas human agents are not capable of simultaneously servicing multiple voice contacts.

Embodiments disclosed herein may enable a contact center to automatically eliminate the voice aspect from a session as soon as the customer's call hits the contact center. The customer may be transitioned into a virtual or digital session. When this transition happens, feedback may be provided to the customer that drives the customer's attention to a user interface (e.g., their phone's touch screen). This can be done without requiring the customer to switch their client.

The present disclosure also provides, via the customer's client device, a native interface (e.g., HTML 5 or an in-application interface) that allows the customer to navigate a full self-service menu. The contact center may also be allowed to push a bot framework through the interface in the mobile domain. This effectively keeps the voice media out of the interaction until it is later decided that voice is needed to further support the customer's needs. There may be rules or some other trigger mechanism to define when the customer is switched back to voice.

When the customer is notified by the contact center that their call is being transitioned away from voice, the customer may be provided with an option to avoid the automated transition and remain on the voice channel; this option can be used by customers that are visually impaired or by customers that cannot devote their full visual attention to the device at that point in time. Alternatively, the contact center may only implement this automated transition if the state of the contact center necessitates the transition—perhaps because the contact center is experiencing heavy call volume, is currently understaffed, etc. For example, the contact center can use as a trigger the applicable "expected waiting time" if the customer call were to be put in queue as a voice interaction. If the "expected waiting time" is beyond some threshold value or exceeds an anticipated amount of time needed for a customer to complete self-service in the digital domain, the call would automatically transition into a digital interaction; otherwise, it would stay as a voice call. This threshold value can be configurable or dynamically responsive to the expected amount of time for a customer to self-service in the digital domain.

The contact center may utilize a new type of reaction to incoming calls. The contact center may initially go through a setup as if the call is a normal voice call, but then the call may progress to a point where a natural feedback mechanism eliminates the voice media and places the customer into the digital domain and doesn't require the customer to move in/out of the messaging and/or browsers. At some point later in time, if the customer or contact center decides to add voice, then the contact center can quickly and seamlessly transition the current digital interaction back into the voice domain.

The present disclosure will describe example implementations in the mobile domain where the customer initiates the voice call with their mobile device and then transitions to the digital domain on their mobile device, most likely via a dedicated application. The customer experience may be carried out entirely within the application or may transition to a web-based interaction. It should be appreciated, however, that embodiments of the present disclosure are not so limited. For instance, it may be possible to implement certain features described herein on a non-mobile platform (e.g., a laptop, a personal computer, etc.)

As used herein, automation of a contact center may refer to a behavior of the contact center whereby interactions are managed by a chatbot, which may use directed dialog based on rules (e.g., expert systems) or Artificial Intelligence (AI).

It should be appreciated that conversations or interactions can be either with an automated agent (e.g., a chatbot) or a human agent. In some embodiments, a digital asynchronous communication channel includes, but is not limited to, a communication modality that is configured to enable digital message communications between a customer's communication device (e.g., a client device, a mobile communication device, a smart phone, a tablet, a PC, a laptop, etc.) and an agent's communication device (e.g., a client device, a mobile communication device, a smart phone, a tablet, a PC, a laptop, a server executing a chatbot, etc.). In some embodiments, the digital asynchronous communication channel may include or utilize one, some, or many different communication pathways, protocols, or messaging services. Non-limiting examples of messaging services that may be supported by a digital asynchronous communication channel include direct digital messaging (e.g., direct chat, SMS text, email, etc.), social media messaging (e.g., social media posts, social media direct messaging, etc.), webchats, or any other communication protocol that enables conversations to occur and be memorialized in non-real-time or near-real-time. While live voice and video conversations are not generally carried out via an asynchronous communication channel, it should be appreciated that embodiments of the present disclosure are contemplated to also facilitate voice and/or video communications between a contact center agent and customer. Embodiments of the present disclosure further contemplate transitioning a contact between synchronous and asynchronous communication channels (e.g., between a digital domain and a voice domain).

As used herein, a message may include one or multiple electronic records, text, rich media, or data structures that are transmitted from one communication device to another communication device via a communication network. A message may be transmitted via one or more data packets and the formatting of such data packets may depend upon the messaging protocol used for transmitting the electronic records over the communication network.

Interactions, as used herein, may correspond to two or more message exchanges between two or more entities over a digital communication channel. In some embodiments, an interaction may correspond to a question and response message pair, a question and question message pair, a statement and response message pair, or a set of messages. As used herein, a conversation may include one or more interactions. Thus, a conversation or interaction may correspond to an exchange of observations, opinions, questions, responses to questions, or ideas. An interaction may occur partially in one domain (e.g., just within a digital domain or just within the voice domain) or an interaction may span both a digital domain and voice domain.

As used herein, a conversation model may correspond to a data set that is useable in a neural network and that has been trained by one or more data sets that describe conversations or message exchanges between two or more entities. The conversation model may be stored as a model data file or any other data structure that is useable within a neural network or an AI system.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or contact center is contemplated to include finite instruction sets and/or artificial intelligence-based models/neural networks to perform some or all of the steps described herein.

DETAILED DESCRIPTION

Figure 1:
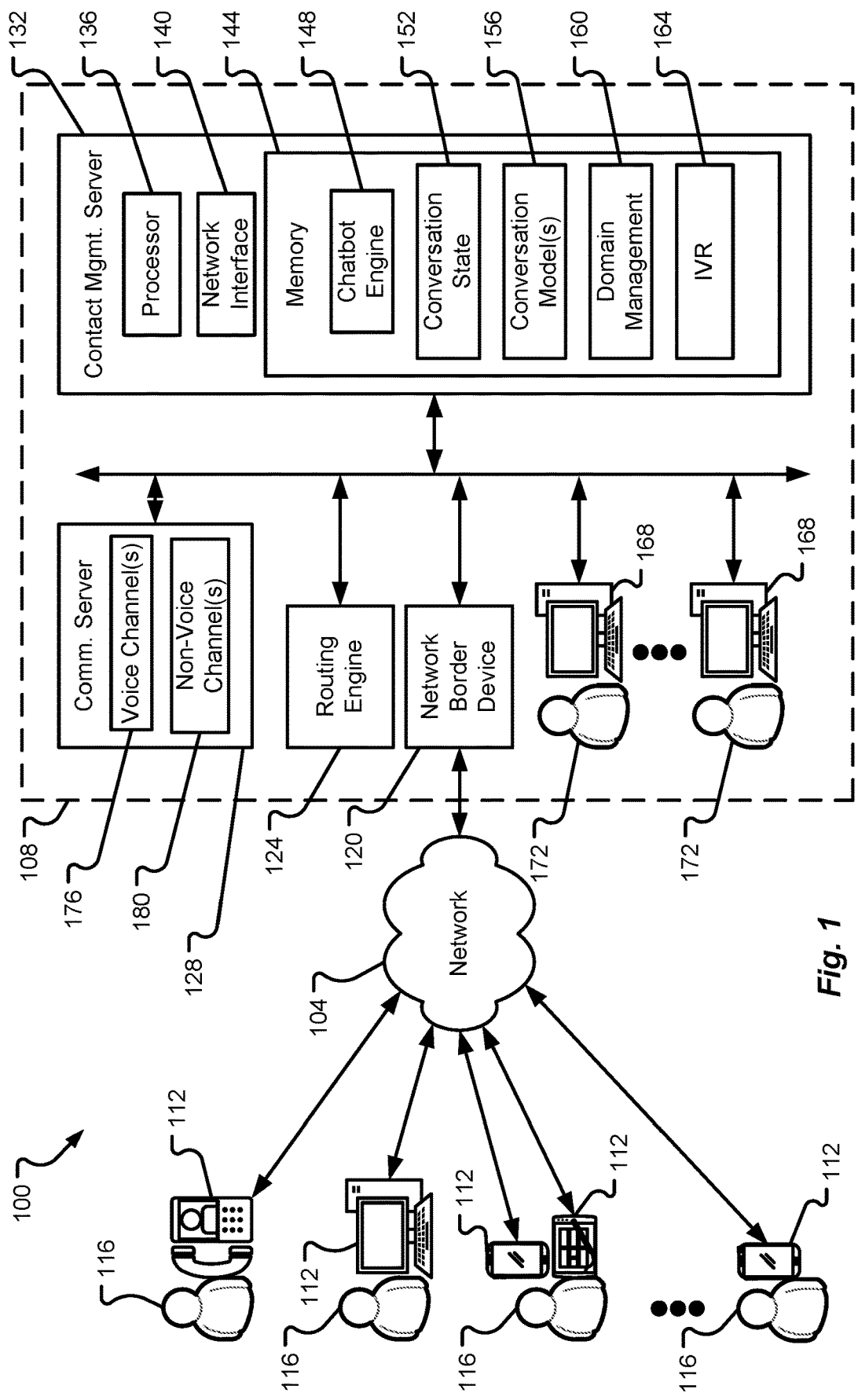
FIG. 1 is a block diagram illustrating a communication system in accordance with at least some embodiments of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local Area Network (LAN) and/or the Internet, or within a dedicated system. Thus, it should be appreciated, that the components of the system can be combined into one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

Embodiments of the disclosure provide systems and methods for transitioning customer contacts within a contact center from a voice domain (e.g., where a voice communication channel is used) to a digital domain (e.g., where a non-voice or digital communication channel is used). Certain examples will be described in connection with automatically transitioning a contact from the voice domain to the digital domain in response to a trigger or in response to a particular condition or set of conditions being met. Other examples will be described in connection with automatically transitioning a contact from the voice domain to the digital domain without concern for a state of the contact center (e.g., as a default action a voice contact is attempted to be transitioned to the digital domain). Embodiments of the disclosure provide systems and methods that enable human users (e.g., customers) to interact with a contact center via an asynchronous communication channel or synchronous communication channel and to transition between the two different types of channels. The human user may be presented with an asynchronous communication channel to support efficient and intuitive communications with the contact center that are more efficient for the customer than the synchronous communication channel Prior contact centers treat voice calls almost entirely within the voice domain. There are no current solutions to automatically transition a voice-based contact to a digital domain to enable more efficient handling and to relieve burdens on the resources (e.g., hardware, ports, etc.) that support the voice domain.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Referring initially to FIG. 1, a communication system 100 will be described in accordance with at least some embodiments of the present disclosure. The communication system 100 is shown to include a communication network 104 that interconnects a contact center 108 and resources thereof with multiple customer communication devices 112. As the name suggests, a customer communication device 112 may be owned and/or operated by a customer 116. The customer 116 may correspond to a user or person that interacts with their customer communication device 112 to communicate with a resource of the contact center 108. Specifically, the contact center 108 may include a number of resources that facilitate customer 116 interactions via synchronous and/or asynchronous communication channels that are presented to or made available for use by the customer 116 and one or more of their customer communication devices 112. As shown in FIG. 1, a customer 116 may utilize one or multiple customer communication devices 112 to interact with the contact center. Moreover, embodiments of the present disclosure contemplate that the customer 116 may use multiple different customer communication devices 112 to communicate via a single communication channel (whether synchronous or asynchronous). As a non-limiting example, a customer 116 may login to a web-based portal or authenticate themselves with a particular chat channel and then utilize the web-based portal or chat channel to communicate with any one of their customer communication devices 112. As another example, and as will be described in further detail herein, a customer 116 may initially call the contact center 104 seeking support via a voice channel 176 (e.g., in the voice domain), but may be transitioned to a non-voice channel 180 (e.g., into the digital domain).

A customer communication device 112 may correspond to a computing device, a personal communication device, a portable communication device, a laptop, a smartphone, a personal computer, and/or any other device capable of running an operating system, a web browser, or the like. For instance, a customer communication device 112 may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These customer communication devices 112 may also have any of a variety of applications, including for example, a database client and/or server applications, web browser applications, chat applications, social media applications, calling applications, etc. A customer communication device 112 may alternatively or additionally be any other electronic device, such as a thin-client computer, Internet-enabled mobile telephone, and/or personal digital assistant, capable of communicating via communication network 104 and/or displaying and navigating web pages or other types of electronic documents.

The communication network 104 can be any type of network familiar to those skilled in the art that can support data communications using any of a variety of commercially-available protocols, including without limitation SIP, TCP/IP, SNA, IPX, AppleTalk, and the like. Merely by way of example, the communication network 104 may correspond to a LAN, such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the IEEE 802.11 suite of protocols, the Bluetooth® protocol known in the art, and/or any other wireless protocol); and/or any combination of these and/or other networks.

The contact center 108 is shown to include one or more computing devices that enable a contact center agent 172 and/or chatbot 148 to interact with a customer 116 via a communication channel established between the customer communication device 112 and the contact center 108. In particular, the contact center 108 is shown to include a network border device 120 and a number of servers 124, 128, 132 that enable functionality of the contact center 108. The network border device 120 may correspond to one or a number of devices that establish and maintain information security for the contact center 108. The network border device 120, in some embodiments, may include a Session Border Controller (SBC), a firewall, a Network Address Translator (NAT) device, a protocol converter, or combinations thereof. Because the communication network 104 may be untrusted from the perspective of an operator of the contact center 108, the network border device 120, in some embodiments, may be configured to implement security policies or rules. When communications, messages, packets, or the like are received at the network border device 120, components of the network border device 120 may analyze the received communications, messages, packets, etc. to determine if the contents of the received communications, messages, packets, etc. can be safely passed to other components of the contact center 108. In some embodiments, all contents that safely pass through the network border device 120 may be transferred to the communication server 128 or routing engine 124 for further analysis and processing (e.g., for inclusion with a particular conversation, for assigning/forwarding to a particular contact center agent 172, etc.).

In some embodiments, each server of the contact center 108 may be configured to perform a particular task or a set of tasks specific to supporting functions of the contact center 108. For instance, the routing engine 124 may correspond to a server or set of servers that are configured to receive messages from the network border device 120 and make routing decisions for the message(s) within the contact center 108. The communication server 128 may correspond to a single server or a set of servers that are configured to establish and maintain a communication channel between customers 116 and the contact center 108. In some embodiments, the routing engine 124 and communication server 128 may work in cooperation to ensure that an appropriate agent 172 or set of agents 172 are assigned to a particular communication channel (e.g., a voice channel 176 or non-voice channel 180) for purposes of servicing/addressing contacts initiated by customers 116 of the contact center 108. Specifically, but without limitation, the routing engine 124 may be configured to determine which agent 172 should be assigned to a particular communication channel for purposes of answering a customer's 116 question and/or for purposes of providing a service to the customer 116. The routing engine 124 may provide appropriate signaling to an agent's communication device 168 that enables the agent's communication device 168 to connect with the communication channel over which the customer 116 is communicating and to enable the agent 172 to view messages sent by the customer's communication device 112, which are eventually assigned to and posted on the appropriate communication channel.

Even more specifically, the communication server 128 may establish and maintain a number of different types of communication channels 176, 180. In other embodiments, different communication servers 128 may be provided to support different types of communication channels 176, 180. For instance, one communication server 128 may be configured to support a voice channel 176 where another communication server 128 may be configured to support non-voice channels 180. It should be appreciated that the voice channel 176 may be established and maintained with any appropriate voice-based communication protocol. It should also be appreciated that any communication with a voice aspect (e.g., a video communication) may include a voice channel 176. In some embodiments, a non-voice channel 180 may include any suitable type of asynchronous communication channel and may be considered to be within a digital domain. Non-limiting examples of communications that may be supported by non-voice channels 180 include chat, IM, SMS, web collaboration, etc.

When messages are received from a customer communication device 112 and assigned to a particular asynchronous communication channel, the routing engine 124 may determine which agent 172 will service the customer's 116 needs (e.g., answer a question, provide a service, etc.) and then connect the selected agent's communication device 168 to the same asynchronous communication channel, thereby enabling the agent 172 to engage in a chat session with the customer 116. Alternatively or additionally, as will be described in further detail herein, the routing engine 124 may connect an automated agent (e.g., a chatbot) to the communication channel to help service the customer's 116 needs in a similar way that an agent's communication device 168 is connected with the communication channel. The difference is that the automated agent (e.g., chatbot) may be configured to respond to the customer's 116 messages transmitted over the communication channel in an automated fashion (e.g., without requiring input from a human user). It should be appreciated that the routing engine 124 may be configured to connect both a human agent 172 and an automated agent (e.g., a chatbot) to the same communication channel or to different communication channels. For instance, it may be desirable to allow the automated agent respond to the customer's 116 messages in a semi-automated fashion (e.g., where the chatbot generates a suggested reply to a message, but a human agent 172 is required to approve or edit the message prior to being transmitted/committed to the communication channel and delivered to the customer communication device 112). As another example, an automated or semi-automated agent may respond to the customer 116 on the asynchronous communication channel (e.g., the non-voice channel 180) whereas a human agent 172 may respond to the customer 116 on the voice channel 176.

It should be appreciated that the communication server 128 may be configured to support any number of communication protocols or applications whether synchronous or asynchronous. Non-limiting examples of communication protocols or applications that may be supported by the communication server 128 include the Session Initiation Protocol (SIP), File Transfer Protocol (FTP), Hypertext Transfer Protocol (HTTP), HTTP secure (HTTPS), Transmission Control Protocol (TCP), Java, Hypertext Markup Language (HTML), Short Message Service (SMS), Internet Relay Chat (IRC), Web Application Messaging (WAMP), SOAP, MIME, Real-Time Messaging Protocol (RTP), Web Real-Time Communications (WebRTC), WebGL, XMPP, Skype protocol, AIM, Microsoft Notification Protocol, email, etc. In addition to supporting text-based communications, the communication server 128 may also be configured to support non-text-based communications such as voice communications, video communications, and the like.

Another server or set of servers that may be provided in the contact center 108 is a contact management server 132. The contact management server 132 may be configured to manage the contacts or work items that exist within the contact center 108 and that represent tasks to be performed by a human agent 172 and/or automated agent (e.g., a chatbot) in connection with providing a service to a customer 116. The contact management server 132 may be configured to maintain state information for some or all of the contacts in the contact center 108 at any given point in time. The contact management server 132 may also be configured to manage and analyze historical contacts as part of training and updating automated agents (e.g., a chatbot engine 148). In some embodiments, the contact management server 132 may maintain state information for human agents 172 in the contact center 108 and may further interact with the routing engine 124 to determine which agents 172 are currently available for servicing a contact and have the appropriate skills for servicing a contact. Additional capabilities of the contact management server 132 will be described in further detail with respect to operation of a chatbot engine 148 and a domain management instruction set 160, which are both shown to be provided by the contact management server 132.

While certain components are depicted as being included in the contact management server 132, it should be appreciated that such components may be provided in any other server or set of servers in the contact center 108. For instance, components of the contact management server 132 may be provided in a routing engine 124 and/or communication server 128, or vice versa. Further still, embodiments of the present disclosure contemplate a single server that is provided with all capabilities of the routing engine 124, the communication server 128, and the contact management server 132.

The contact management server 132 is shown to include a processor 136, a network interface 140, and memory 144. The processor 136 may correspond to one or many computer processing devices. Non-limiting examples of a processor include a microprocessor, an Integrated Circuit (IC) chip, a General Processing Unit (GPU), a Central Processing Unit (CPU), or the like. Examples of the processor 136 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The network interface 140 may be configured to enable the contact management server 132 to communicate with other machines in the contact center 108 and/or to communicate with other machines connected with the communication network 104. The network interface 140 may include, without limitation, a modem, a network card (wireless or wired), an infra-red communication device, etc.

The memory 144 may include one or multiple computer memory devices. The memory 144 may be configured to store program instructions that are executable by the processor 136 and that ultimately provide functionality of the communication management server 132 described herein. The memory 144 may also be configured to store data or information that is useable or capable of being called by the instructions stored in memory 144. One example of data that may be stored in memory 144 for use by components thereof is conversation state data 152. The conversation state data 152 may represent a particular state of one or multiple conversations occurring on a communication channel 176, 180. The memory 144 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 144, in some embodiments, corresponds to a computer-readable storage media and while the memory 144 is depicted as being internal to the contact management server 132, it should be appreciated that the memory 144 may correspond to a memory device, database, or appliance that is external to the contact management server 132.

Illustratively, the memory 144 is shown to store a chatbot engine 148 for execution by the processor 136. In some embodiments, the chatbot engine 148 may correspond to a set of processor-executable instructions (e.g., a finite instruction set with defined inputs, variables, and outputs). In some embodiments, the chatbot engine 148 may correspond to an Artificial Intelligence (AI) component of the contact management server 132 that is executed by the processor 136. The chatbot engine 148, in some embodiments, may utilize one or more conversation models 156, which may be in the form of an artificial neural network, for recognizing and responding to messages transmitted by a customer 116 over a communication channel 176, 180 supported by the communication server 128. In some embodiments, the chatbot engine 148 may be trained with training data and may be programmed to learn from additional conversations as such conversations occur or after conversations occur. In some embodiments, the chatbot engine 148 may update one or more of the conversation models 156 as it learns from ongoing conversations.

The memory 144 is also shown to include a domain management instruction set 160, which may be configured to support domain management as will be described in further detail herein. Specifically, but without limitation, the domain management instructions set 160 may be configured to automatically transition a call from a customer 116 from a voice domain (e.g., from a voice channel 176) into the digital domain (e.g., to a non-voice channel 180). In some embodiments, the domain management instruction set 160 may be configured to implement the transition from the voice domain to the digital domain automatically and without any human input. In some embodiments, the domain management instruction set 160 may be configured to reference certain rules for transitioning a call from one domain to another and then implementing a transition process in the rules are satisfied. Such rules may depend upon a current state of the contact center 108 (e.g., agent utilization, estimate wait time, current number of voice calls on hold, current number of customers 116 on hold, etc.). Such rules may depend upon one or more Key Performance Indicators (KPIs) of the contact center 108 and whether or not such KPIs are meeting a predetermined KPI threshold. Examples of such KPIs include, without limitation, customer wait time, average time in queue, average abandonment rate, percentage of calls blocked, service level, average speed of answer, average handle time, average after call work time, first call resolution, customer satisfaction, occupancy rate, agent absenteeism, and agent turnover rate. If one or more of these KPIs do not meet a predefined threshold, then the domain management instruction set 160 may be configured to transition a call from the voice domain into the digital domain. The domain management instruction set 160 may also be configured to transition a call back to the voice domain from the digital domain as will be described in further detail herein. When the customer 116 is interacting with the contact center 108 using a voice channel 176, the customer 116 may receive self-service via an IVR 164. The IVR 164 may present the customer 116 with various self-service options based on an IVR tree as is known in the contact center arts. On the other hand, when the customer 116 is interacting with the contact center using a non-voice channel 180, the customer 116 may receive self-service via the chatbot engine 148, other automated mechanisms, and/or a human agent 172.

Figure 2:
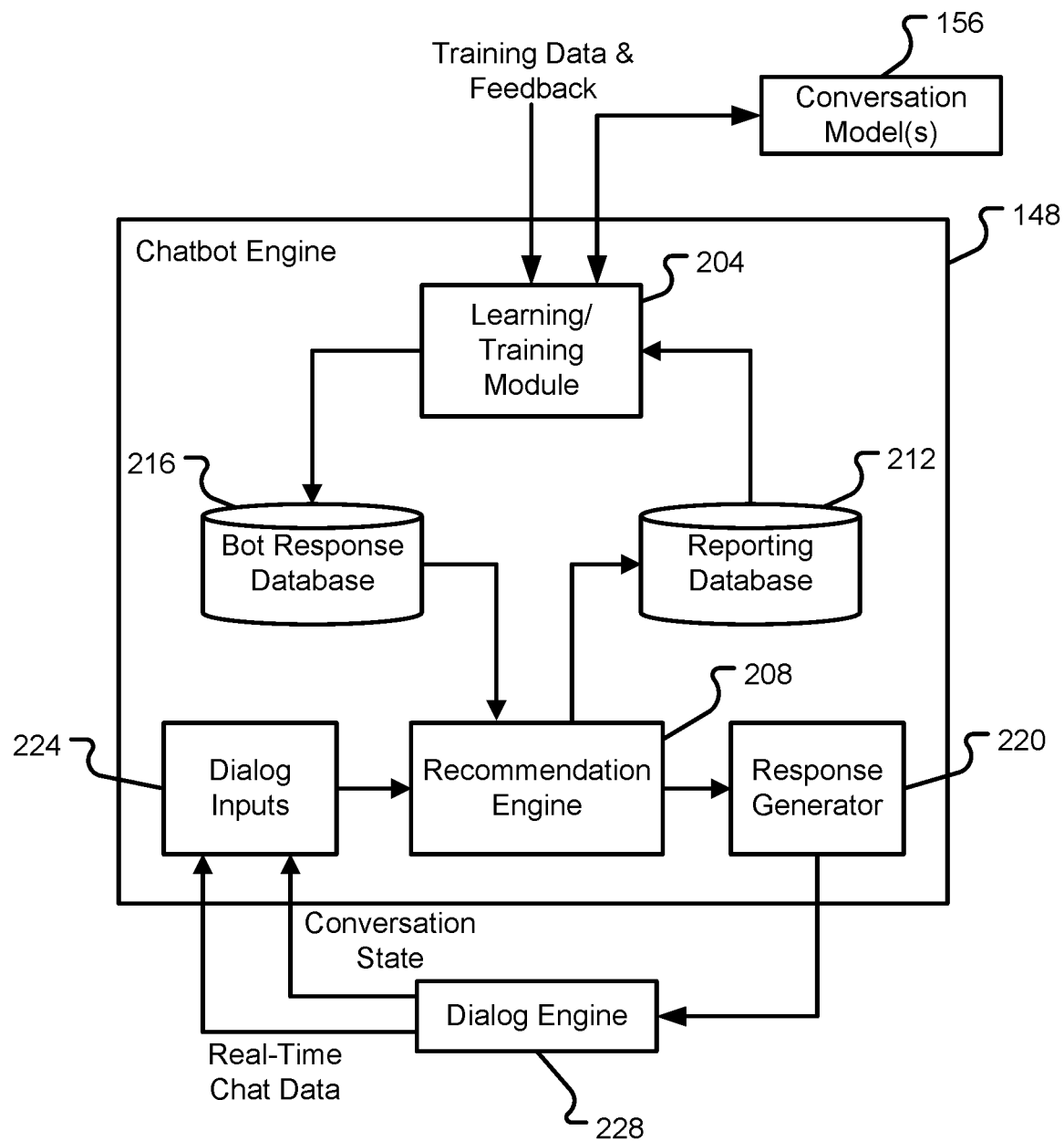
FIG. 2 is a block diagram depicting additional details of a chatbot engine in accordance with at least some embodiments of the present disclosure.

In addition to the chatbot engine 148, the memory 144 may also include a dialog engine 228 as shown in FIG. 2. It should be appreciated that the chatbot engine 148 and dialog engine 228 may be provided in a single component without departing from the scope of the present disclosure. The dialog engine 228 may be configured to analyze a conversation between a chatbot engine 148 and a customer 116 and determine, based on the analysis, a current state of the conversation (e.g., a dialog or conversation state 152). Accordingly, the dialog engine 228 may be configured to update the conversation state 152 based on a content of messages sent by a customer 116 and based on a content of messages sent by the chatbot engine 148. The dialog engine 228 may be configured to advance conversation states 152.

As mentioned above, the chatbot engine 148 may be configured to operate using a set of guidelines (e.g., as a set of static instructions) or by using machine learning. Further details of a chatbot engine 148 utilizing machine learning will now be described with reference to FIG. 2. Again, the chatbot engine 148 utilizing machine learning may have access to training data to initially train behaviors of the chatbot engine 148. The chatbot engine 148 may also be configured to learn from further conversations based on feedback, which may be provided in an automated fashion (e.g., via a recursive learning neural network) and/or a human-provided fashion (e.g., by a human agent 172 confirming or denying that a particular response prepared by the chatbot engine 148 was appropriate for a particular message received from a customer 116).

A learning/training module 204 of the chatbot engine 148 may have access to and use one or more conversation models 156. The conversation models 156 may be built and updated by the training/learning module 204 based on the training data and feedback. The learning/training module 204 may also be configured to access information from a reporting database 212 for purposes of building a bot response database 216, which stores bot responses that have been previously provided by the chatbot engine 148 and have been identified as valid or appropriate under the circumstances (e.g., based on a positive response from a customer 116 and/or based on administrative user inputs). Responses within the bot response database 216 may constantly be updated, revised, edited, or deleted by the learning/training module 204 as the chatbot engine 148 engages in more conversations with customers 116.

In some embodiments, the chatbot engine 148 may include a recommendation engine 208 that has access to the bot response database 216 and selects appropriate response recommendations from the bot response database 216 based on dialog inputs 224 received from the dialog engine 228. As shown in FIG. 2, the dialog engine 228 may provide dialog inputs 224 in the form of real-time chat data and/or in the form of conversation state 152 information. The real-time chat data may correspond to the content of a message received on a communication channel from a customer's communication device 112. In other words, the dialog engine 228 may be configured to retrieve message content from a digital communication channel and provide such content to the chatbot engine 148 in the form of dialog inputs 224. Using the dialog inputs and the bot response database 216, the recommendation engine 208 may be configured to recommend one or multiple responses to a response generator 220. The response generator 220 may be configured to provide a selected response to the dialog engine 228 for sending on the non-voice communication channel 180. Stated another way, the dialog engine 228 may be responsible for managing a state of a conversation and may provide the mechanism by which the chatbot engine 148 engages with the asynchronous communication channel and the customer 116. For instance, the dialog engine 228 may produce a response message for a chat channel over which a customer 116 previously transmitted a message. The interactions between the chatbot engine 148 and customer 116 may represent a contact within the contact center 108 and the status of the contact may be determined by the dialog engine 228, which updates the conversation state 152 accordingly. In some embodiments, the chatbot engine 148 may be configured to interact with a customer 116 in such a way that the customer 116 is unaware they are interacting with an automated agent, but rather think themselves to be interacting with a human agent 172.

To achieve this capability, the chatbot engine 148 may constantly be provided training data from conversations between human agents 172 and customers 116 that have occurred over a particular communication channel (e.g., voice communication channel 176 and/or non-voice communication channel 180). It may be possible to train a chatbot engine 148 to have a particular skill (e.g., by training the chatbot engine 148 with conversations related to a particular topic such as sales, product troubleshooting, billing, reservation assistance, etc.). Accordingly, it should be appreciated that the contact center 108 may include a plurality of chatbot engines 148 of different types without departing from the scope of the present disclosure.

With reference now to FIGS. 3A through 3G, various customer 116 interactions with a contact center 108 will be described in accordance with at least some embodiments of the present disclosure. Specifically, FIGS. 3A through 3G illustrate various possible screens or interfaces that may be presented to the customer 116 via a user interface 308 of a mobile device 304. It should be appreciated that the mobile device 304 represents one example of a customer communication device 112. It should also be appreciated that similar or identical options may be presented to a customer 116 on any type of customer communication device 112 and that embodiments of the present disclosure are not limited to a mobile device 304. For instance, a customer 116 may be allowed to interact with a contact center 108 over a voice communication channel 176 and/or non-voice communication channel 180 using a PC, laptop, etc. and any suitable type of graphical user interface (GUI) elements may be presented to the customer 116 via a user interface 308 of such a device 112.

Figure 3A:
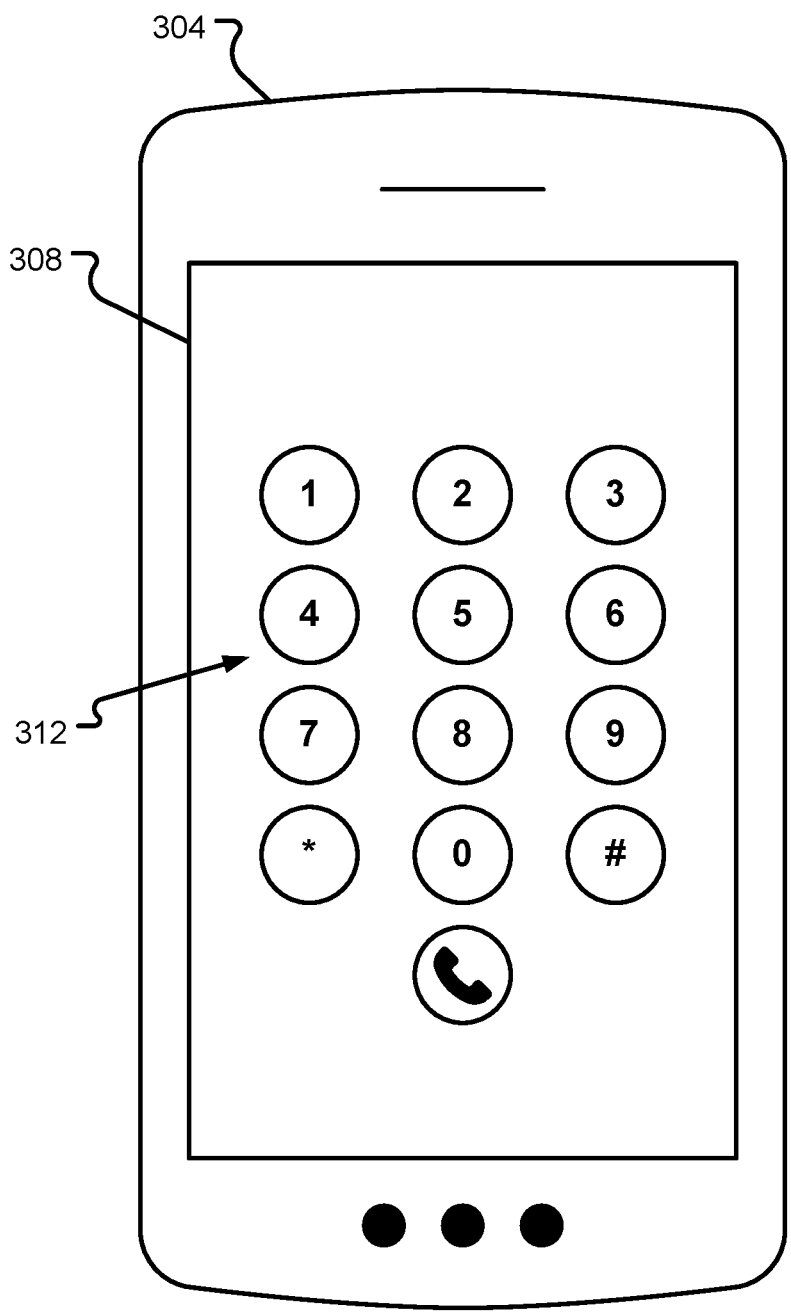
FIG. 3A is a first screen shot of a graphical user interface of a customer communication device in accordance with at least some embodiments of the present disclosure.

Referring initially to FIG. 3A, a customer 116 may initially be presented with a dialing screen 312 in which one or more dialing options are presented to the customer 116 that enable the customer 116 to dial a telephone number associated with the contact center 108. While the dialing screen 312 illustrates inputs that can be used to generate a Dual-Tone Multifrequency (DTMF) output with the mobile device 104, it should be appreciated that any type of interface may be presented to the customer 116. Specifically, the customer 116 may be viewing a website of a business and the website may include a hyperlink or the like that causes the browser of the mobile device 304 to automatically dial a number associated with the business. As another non-limiting example, the customer 116 may be provided with a dialing screen 312 that includes a list of contacts, favorites, or other numbers dialed by the customer with some degree of frequency. As another non-limiting example, the dialing screen 312 may be presented within an application of the mobile device 304 that is provided by a company that also operates the contact center 108. In some embodiments, the dialing screen 312 may include one or more buttons or touch-sensitive inputs that cause the mobile device 304 to dial a number associated with the contact center 108.

Figure 3B:
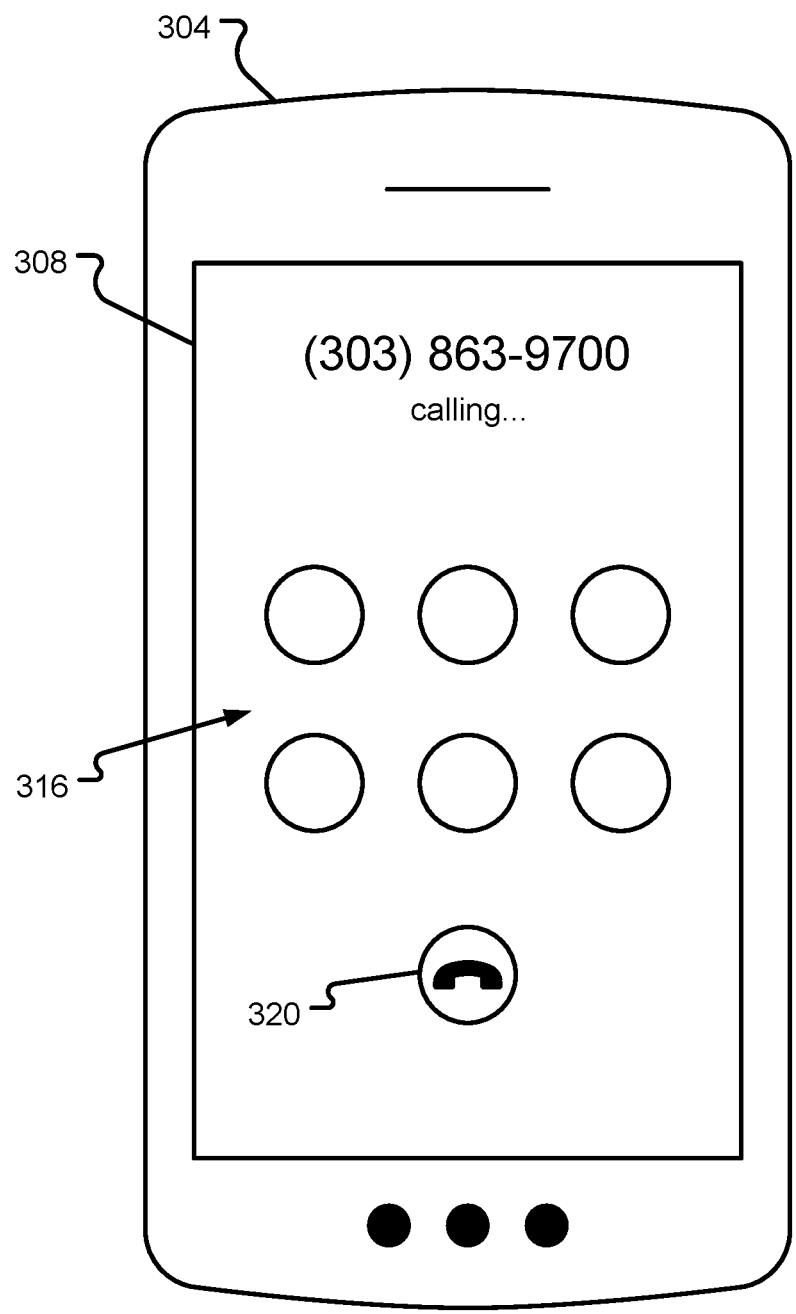
FIG. 3B is a second screen shot of a graphical user interface of a customer communication device in accordance with at least some embodiments of the present disclosure.

FIG. 3B illustrates a ringing screen 316 in which different inputs and/or outputs may be presented to the customer 116 as compared to the inputs/outputs presented in the dialing screen 312. In the ringing screen 316 the customer 116 may be presented with a hang-up input 320 that would cause the mobile device 304 to discontinue or remove itself from a voice communication channel 176 established with the contact center 108. It should be appreciated that the ringing screen 316 may be presented when the call to the contact center 108 is ringing, but before a voice communication channel 176 has been fully established between the mobile device 304 and resources of the contact center 108.

Figure 3C:
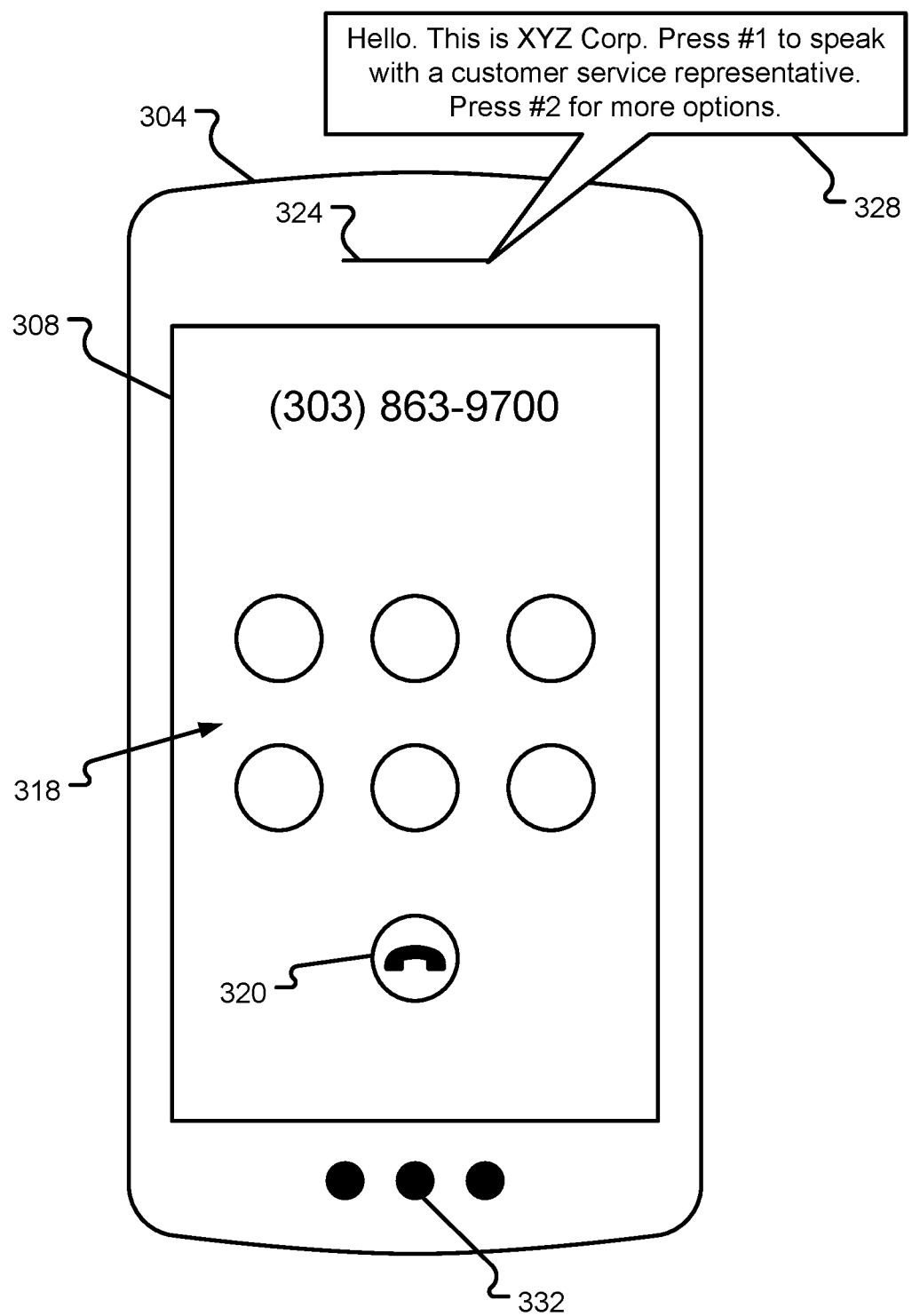
FIG. 3C is a third screen shot of a graphical user interface of a customer communication device in accordance with at least some embodiments of the present disclosure.

FIG. 3C illustrates a talking screen 318, which may be presented when a customer 116 is talking with a human agent 172 or connected to the IVR 164 of the contact center 108. In some embodiments, the talking screen 318 may not be presented until a voice channel 176 is established between the contact center 108 and the customer communication device 112. In some embodiments, the talking screen 318 may be hidden from presentation by the user interface 308 if the mobile device 304 is within a predetermined proximity of the customer's 116 face or head (e.g., if the mobile device 304 is being held to the customer's 116 ear). Such proximity may be detected with a proximity detector or sensor on the mobile device 304.

FIG. 3C also illustrates that when a voice channel 176 has been established, then audio communications are enabled between the customer 116 and contact center 108. Specifically, but without limitation, the customer 116 may receive audio content 328 from an agent 172 or IVR 164 of the contact center 108. The audio content 328 may be provided to the customer 116 by a speaker 324 of the mobile device 304. In a similar fashion, the customer 116 may be able to provide audio content to the contact center by one or more inputs of the mobile device 304. For instance, the mobile device 304 may include a microphone 332 that captures audio input from the customer 116 and transmits the audio content via the voice channel 176 to the contact center 108. Alternatively or additionally, the customer 116 may interact with the IVR 164 using DTMF outputs generated at the mobile device 304. The exchange of audio input may be facilitated during an audio only interaction or during a video interaction that includes an audio component. In some embodiments, the audio content 328 provided to the customer 116 may include a list of options for traversing an IVR tree provided by the IVR 164.

Figure 3D:
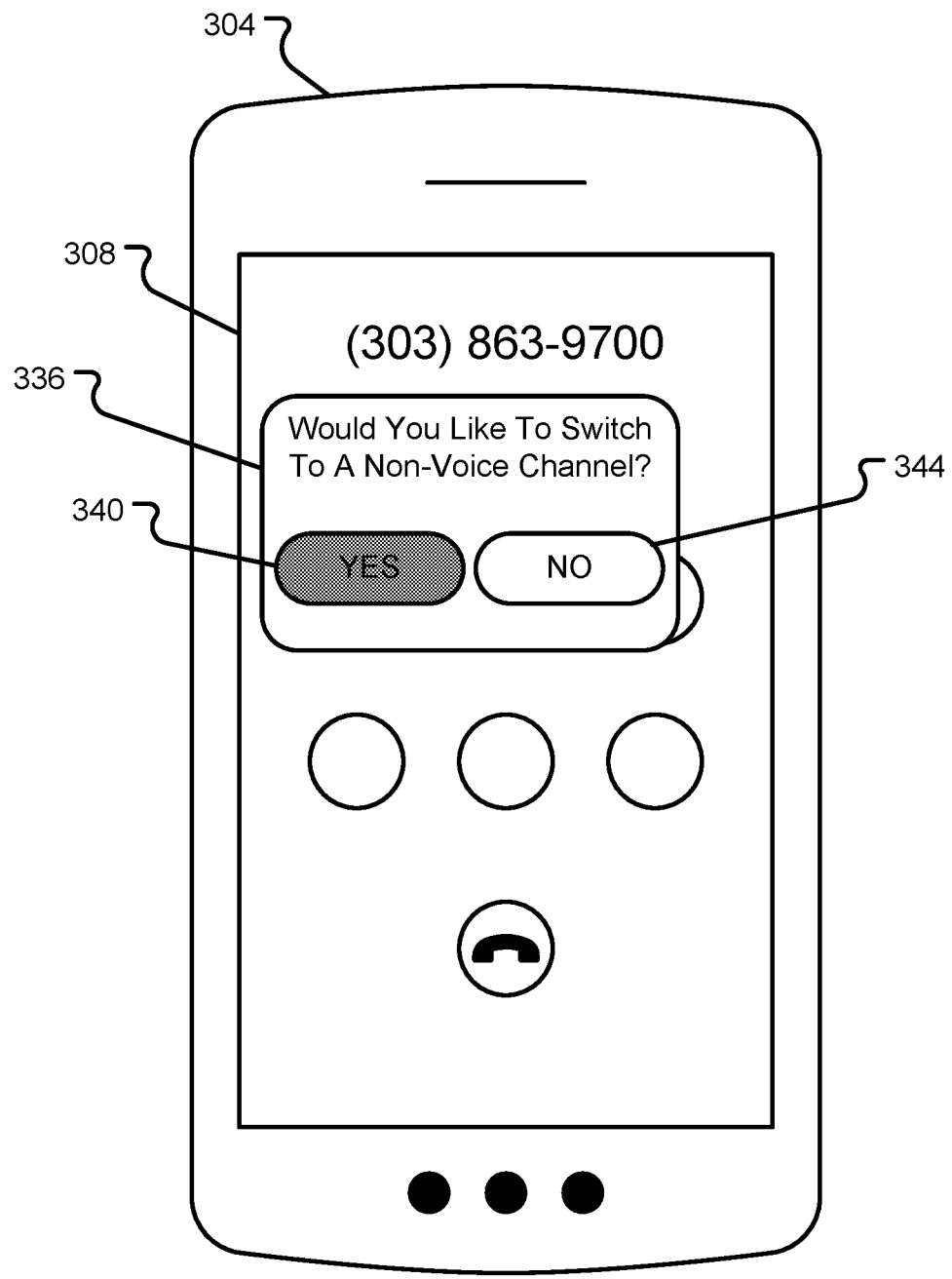
FIG. 3D is a fourth screen shot of a graphical user interface of a customer communication device in accordance with at least some embodiments of the present disclosure.

As can be seen in FIG. 3D and in accordance with at least some embodiments, the contact center 108 may be configured to facilitate a transition of the call away from the voice channel 176 (e.g., away from the voice or audio domain) to a non-voice channel 180 (e.g., into the digital domain). Specifically, the contact center 108 may utilize the domain management instruction set 160 to initiate a transition toward the digital domain and to establish a non-voice channel 180 between the contact center 108 and customer communication device 112 (e.g., the mobile device 304). The domain management instruction set 160 may be configured to determine that timing is appropriate to transition a call from the voice domain into the digital domain. In some embodiments, the transition may be triggered immediately in response to establishing the voice channel 176. In some embodiments, the transition may be triggered in response to a customer 116 selecting a particular self-service option presented by the IVR 164. In some embodiments, the transition may be triggered in response to detecting a particular state of the contact center 108. In some embodiments, the transition may be triggered by a combination of the above-noted conditions. In some embodiments, the transition may occur automatically, but only after capabilities of the customer's 116 mobile device 304 have been determined and found capable of supporting an appropriate non-voice channel 180.

The domain management instruction set 160 may send a request to the mobile device 304 or otherwise cause the mobile device 304 to present a pop-up window 336 that includes a presentation of options 340, 344 for the customer 116. In some embodiments, the pop-up window 336 may include an acceptance option 340 and a decline option 344. If the customer 116 selects the acceptance option 340 as shown in FIG. 3D, then the domain management instruction set 160 may take further action to transition the call as will be described herein. Alternatively, if the customer 116 selects the decline option 344, then the customer 116 may remain on the voice channel 176 and no further steps may be taken in connection with transitioning the call from the voice domain to the digital domain. The pop-up window 336 presented to the customer 116 may be presented by the user interface 308 of the mobile device 304. The pop-up window 336 may be presented as part of an in-application option or window. Thus, while described as a pop-up window 336 it should be appreciated that the acceptance option 340 and/or decline option 344 may be presented in some other window, frame, or GUI element. It should also be appreciated that the acceptance option 340 and/or decline option 344 may be optional and not required. Rather, the domain management instruction set 160 may automatically initiate the transition and not request input or permission from the customer 116.

In such a scenario, the customer 116 may or may not be notified of the transition with a text-based presentation of information via the user interface 308.

Figure 3E:
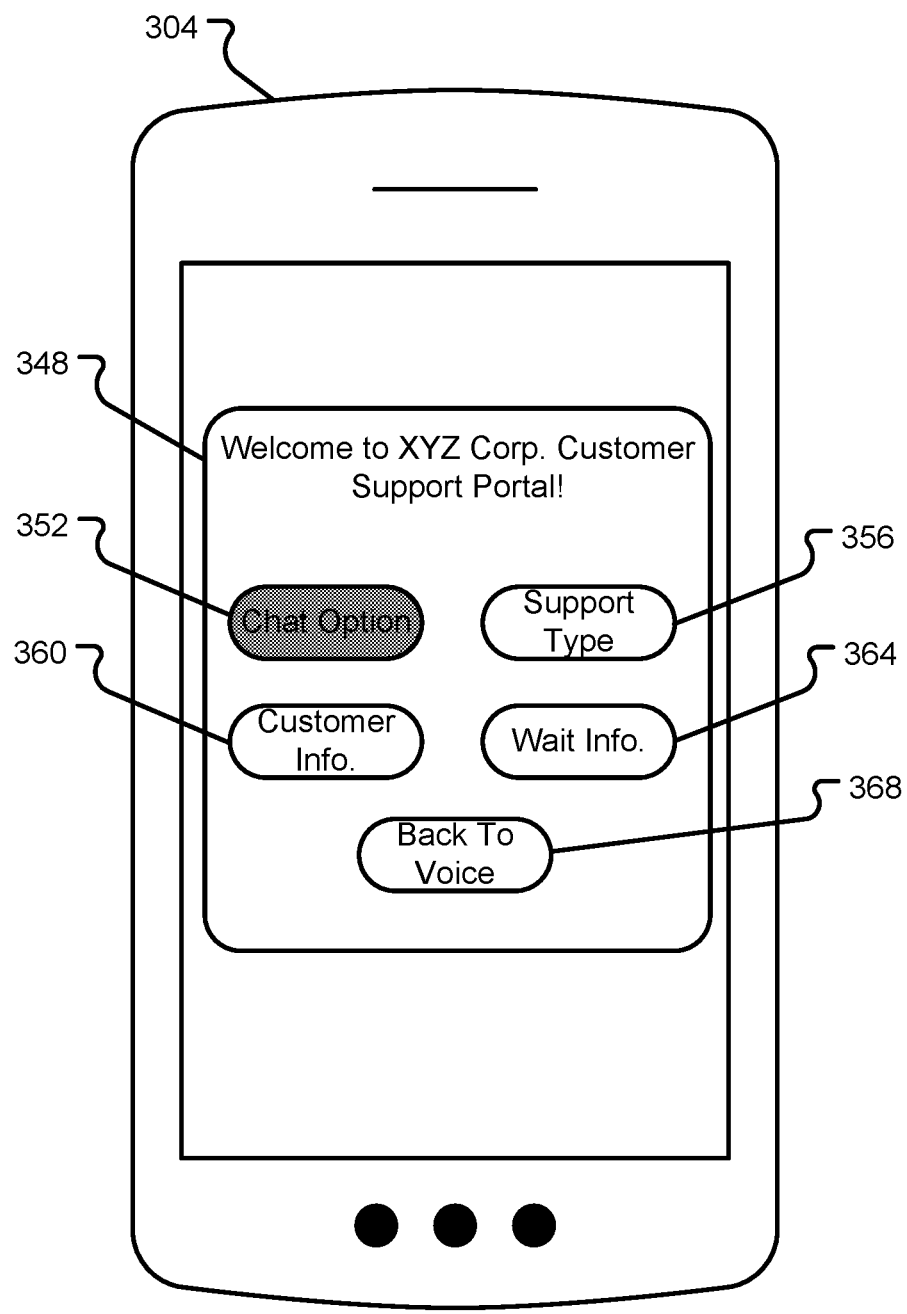
FIG. 3E is a fifth screen shot of a graphical user interface of a customer communication device in accordance with at least some embodiments of the present disclosure.

FIG. 3E illustrates an example of a digital options menu 348, which may be presented to the customer 116 via the mobile device 304 when the contact center transitions the call from the voice channel 176 to the non-voice channel 180. The digital options menu 348 may include a visual component (e.g., icons, buttons, touch-based user inputs, soft buttons, etc.) or multiple GUI elements that present one or more options to the customer 116 for navigating the self-service framework of the digital domain. In some embodiments, the options provided within the digital options menu 348 may be controlled by the entity that operates the contact center 108. The options may also depend upon the nature of the non-voice channel 180 being used to service the contact within the digital domain. As a non-limiting example, if the non-voice channel 180 corresponds to a first type of channel (e.g., a web collaboration), then the digital options menu 348 may include an entire website or HTML document that is being co-browsed by the customer 116. As another non-limiting example, if the non-voice channel 180 utilizes a different protocol that enables the customer 116 to receive self-service via an application on the mobile device 304, then a different set of options may be presented. In another example, if the non-voice channel 180 is an SMS or chat channel, then more simplified options may be presented to the customer 116 as compared to a scenario in which the customer 116 is co-browsing a website.

Figure 3F:
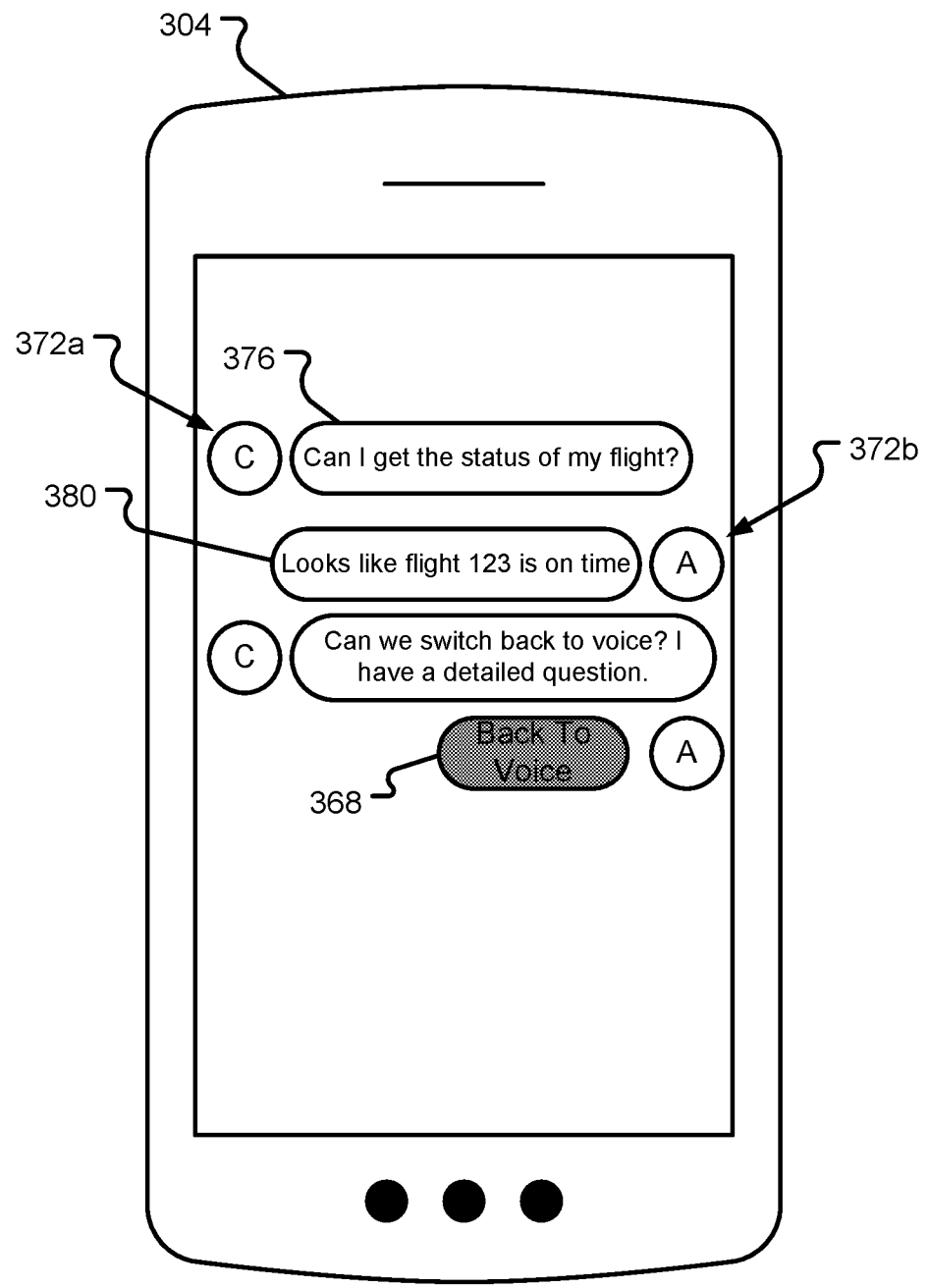
FIG. 3F is a sixth screen shot of a graphical user interface of a customer communication device in accordance with at least some embodiments of the present disclosure.

The illustrative options that may be presented to the customer 116 via the digital options menu 348 include, without limitation, a chat option 352, a support type option 356, a customer information option 360, a wait information option 364, and a back-to-voice option 368. Selection of the chat 352 option may cause the mobile device 304 to present the customer 116 with a chat window as shown in FIG. 3F, where the customer 116 is allowed to engage in a chat conversation with an agent (e.g., a human agent, automated agent, and/or chatbot). The chat conversation may include customer-provided inputs 372a that are presented on the chat communication channel as a customer chat message 376. The chat conversation may also include agent-provided inputs 372b that are presented on the chat communication channel as agent chat messages 380. The agent chat messages 380 may be generated by a human agent 172 or an automated agent.

In some embodiments, the chat conversation may also be utilized to present one or more options to the customer 116. For instance, FIG. 3F illustrates that a customer 116 may be presented with a back-to-voice option 368 if the content of the conversation dictates that such an option is likely desired by the customer 116. It should be appreciated that other options may be presented in the chat conversation without departing from the scope of the present disclosure.

Referring back to FIG. 3E, the support type option 356, if selected by the customer 116, may cause the mobile device 304 to present different self-service support options to the customer. Such options may include an option to select different types of non-voice communication channels 180. The support type option 356 may also allow the customer 116 to select whether they receive automated support from an automated resource of the contact center (e.g., a chatbot) or human support from a human agent 172.

The customer information option 360 may provide the customer 116 with the ability to input information prior to receiving service from another resource of the contact center 108 (e.g., enter a name, number, customer number, nature of issue, etc.). Information provided via the customer information option 360 may be stored in a Customer Relationship Management (CRM) database and eventually presented to a human agent 172 when the agent 172 is connected to the customer 116.

The wait information option 364 may provide the customer 116 with wait information describing a nature of the wait time being experienced in the contact center 108. Selecting the wait information option 364 may cause the contact center 108 to send the customer 116 various types of wait information such as estimated wait time for a voice interaction with a human agent 172, estimated wait time for a chat interaction with a human agent 172, estimated wait time until a callback may be received, actual wait time being experienced by the customer 116, etc.

The back-to-voice option 368 may provide the customer 116 with options for transitioning the conversation from the digital domain back into the voice domain. In some embodiments, if the customer 116 selects the back-to-voice option 368, then the contact center 108 may invoke the domain management instruction set 160 to move the customer 116 back onto a voice channel 176. The non-voice channel 180 being used to present the digital options menu 348 may still be maintained even if the customer 116 is moved back onto a voice channel 176 (e.g., the customer 116 may be serviced with multiple types of channels simultaneously).

Figure 3G:
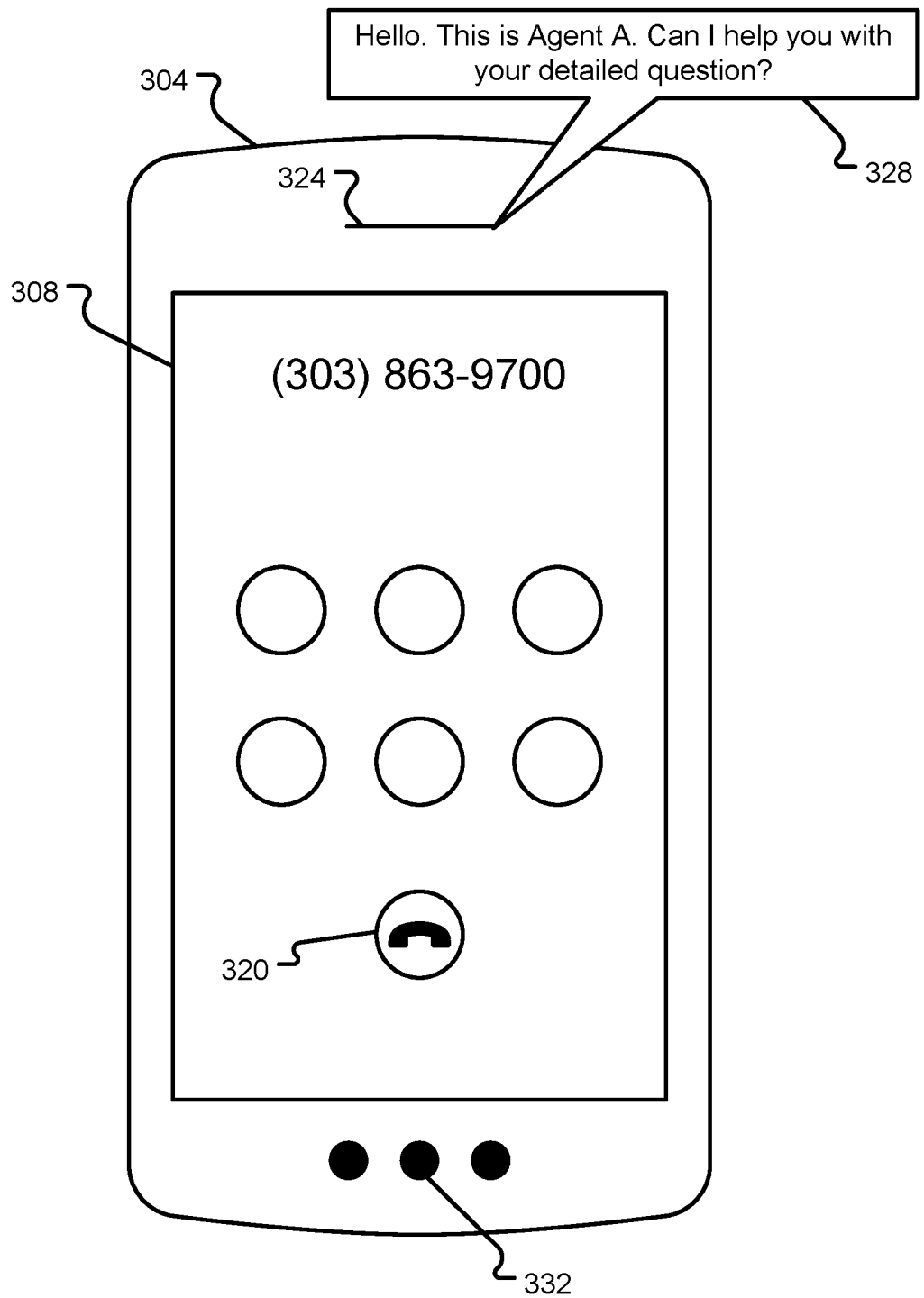
FIG. 3G is a seventh screen shot of a graphical user interface of a customer communication device in accordance with at least some embodiments of the present disclosure.

As shown in FIG. 3G, if the customer 116 selects the back-to-voice option 368 (e.g., from within the chat conversation or from the digital options menu 348), then the customer 116 may begin interacting with the contact center 108 using audio components exchanged over the voice channel 176. The agent 172 or an automated assistant (e.g., provided from the IVR 164) may then provide audio content 328 to the customer 116 and vice versa.

Figure 4:
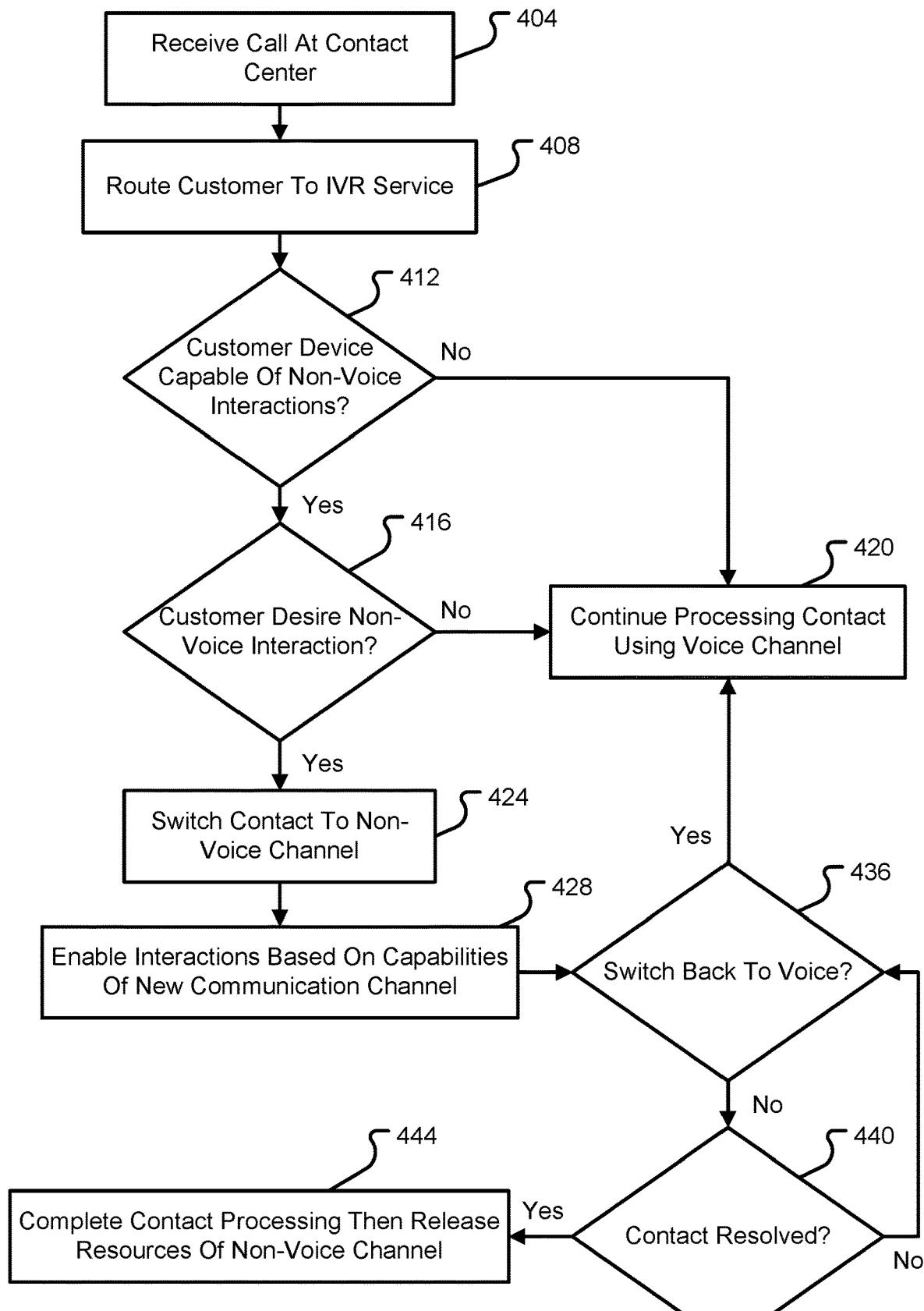
FIG. 4 is a flow diagram depicting a method of operating a contact center in accordance with at least some embodiments of the present disclosure.

With reference now to FIG. 4, additional details of a method of operating a contact center 108 will be described in accordance with at least some embodiments of the present disclosure. The method begins when a call is received at the contact center 108 (step 404). The call may correspond to a voice call, a video call, or any other type of call that enables an exchange of audio content between the customer 116 and a resource of the contact center 108. In some embodiments, the call may be initiated by the customer 116. In other embodiments, the call may be initiated by the contact center 108, but answering the call by the customer 116 may cause the contact center 108 to recognize the call and begin processing the call as a received call.

The method continues by routing the customer 116 to an automated service that utilizes the voice channel 176 (step 408). In some embodiments, the customer 116 may be routed to an IVR 164 that presents the customer with self-service options based on an IVR tree programmed into the IVR 164.

The method may further continue with the domain management instruction set 160 determining whether the customer communication device 112 is capable of non-voice interactions (step 412). This determination may be made based on determining a device type for the customer communication device 112. Alternatively or additionally, information describing an operating system, an application stored on the customer communication device 112, browsing capabilities of the customer communication device 112, or some other operational capability of the customer communication device 112 may be analyzed by the domain management instruction set 160.

If this query is answered negatively, then the method continues by continuing the customer interaction and contact processing using the voice channel 176 (step 420). On the other hand, if the query of step 412 is answered positively, then the method proceeds with an optional step of determining whether or not the customer 116 desires to continue with a non-voice interaction on a non-voice communication channel 180 (step 416). Again, this step may be option in the event that the contact center 108 is configured to automatically transition all calls to a non-voice interaction. If the query of step 416 is answered negatively, then the method may proceed to step 420. If the query of step 416 is answered positively or if the transition is automatically initiated by the contact center 108 without soliciting customer 116 input, then the method may proceed by switching the contact to the non-voice channel 180 (step 424). In some embodiments, the switching step may cause the customer communication device 112 to switch an application presented to the customer 116. In some embodiments, the switching step may cause a different set of GUI elements to be presented to the customer 116. The switching step may also include terminating the voice channel 176, although the additional step of terminating the voice channel 176 in favor of the non-voice channel 180 is not required. The switching step, in other embodiments, may involve enabling the customer 116 to interact with the contact center resources via one or more non-voice channels 180 (and optionally maintain the voice channel 176) (step 428).

The customer 116 may continue to interact with the contact center 108 using the non-voice channel(s) 180 and the nature of the interactions may depend the capabilities provided by the non-voice channels 180. As mentioned above, the customer 116 may or may not also be allowed to continue interacting with the contact center 108 using the voice channel 176.

The method may continue by determining whether or not the customer 116 and/or contact center 108 desires to switch the customer 116 back to the voice channel 176 (step 436). The decision to switch a customer 116 (and the contact representing the customer 116 interaction within the contact center 108) may be made by the contact center 108 in the event that the contact center 108 (e.g., the domain management instruction set 160) determines that some aspect of the customer interaction could be improved with the use of a voice channel 176. Alternatively or additionally, the customer 116 may provide an input to the contact center 108 indicating a desire to switch back to the voice interactions. The switch back to voice interactions may or may not cause the contact center 108 to tear down the non-voice channels 180 previously used to support customer interactions in the digital domain.

If the query of step 436 is answered positively, then the method may proceed to step 420. On the other hand, if the query of step 436 is answered negatively, then the contact center 108 may determine whether or not the contact has been resolved (step 440). If the contact has not yet been resolved (e.g., because there is still work required to resolve the contact or because the customer has not indicated their issue has been resolved), then the method may return back to step 436 or possibly step 428. If the contact is determined to be resolved (which may occur within the voice domain and/or digital domain), then the method may proceed with the contact center completing contact processing and releasing any resources that were being used to support the voice channel 176 and/or non-voice channel 180 (step 444). In some embodiments, the non-voice channel 180 may be left open and available for the customer 116 to use at a later time thanks to the asynchronous nature of the non-voice channel 180. Additional processing at the contact center 108 side may include after call work that is performed by the human agent 172.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of operating a contact center, the method comprising:
receiving, at the contact center, a call from a customer communication device;
analyzing a state of the contact center;
determining, based on the analyzing of the state of the contact center, that the state of the contact center necessitates a transition of the call from a voice domain into a digital domain;
automatically transitioning the call from the voice domain into the digital domain in response to determining that the state of the contact center necessitates the transition of the call from the voice domain into the digital domain;

enabling at least one of an agent communication device and a chatbot to interact with the customer communication device in at least the digital domain after the call has been transitioned from the voice domain into the digital domain;

establishing a voice channel between the customer communication device and the agent communication device;

establishing a non-voice channel between the customer communication device and at least one of the agent communication device and the chatbot; and automatically terminating the voice channel after the non-voice channel has been established and before the non-voice channel is terminated.

2. The method of claim 1, wherein transitioning the call from the voice domain into the digital domain comprises enabling at least one of the agent communication device and the chatbot to service a contact of a customer over the non-voice channel in lieu of the voice channel.

3. The method of claim 2, further comprising:

providing the customer with a self-service option via the non-voice channel.

4. The method of claim 1, further comprising:

prior to transitioning the call from the voice domain into the digital domain, connecting the customer communication device with an Interactive Voice Response (IVR) system;

presenting the customer communication device with a list of IVR self-service options; and receiving a customer response at the IVR system, wherein the customer response is received over the voice channel.

5. The method of claim 1, wherein analyzing the state of the contact center comprises analyzing a call volume of the contact center, and wherein at least one of the agent communication device and the chatbot interacts with the customer communication device in at least the digital domain by at least one of text-based messaging and a web collaboration.

6. The method of claim 1, further comprising:

establishing an asynchronous communication channel to facilitate interactions between the customer communication device and at least one of the agent communication device and the chatbot in the digital domain.

7. The method of claim 1, wherein the chatbot is used to provide a customer with a self-service option via the non-voice channel in the digital domain, and wherein the automatically transitioning occurs without any human input.

8. The method of claim 1, wherein the automatically terminating occurs after the call has been automatically transitioned into the digital domain, and wherein the automatically terminating occurs without any human input.

9. A communication system, comprising:

a processor; and computer memory storing data thereon that enables the processor to:

receive, in a contact center, a call from a customer communication device;

establish a voice channel between the contact center and the customer communication device;

establish a non-voice channel between the contact center and the customer communication device;

automatically transition a contact from the voice channel to the non-voice channel based on a determined state of the contact center thereby enabling at least one of an agent using an agent communication device and a chatbot to service a contact for a customer using the customer communication device via the non-voice channel; and automatically terminate the voice channel after the non-voice channel has been established and before the non-voice channel is terminated.

10. The communication system of claim 9, wherein the data stored on the computer memory further enables the processor to:

provide the customer with a self-service option via the non-voice channel.

11. The communication system of claim 10, wherein the self-service option is provided to the customer via the chatbot, wherein the chatbot responds to the customer via the non-voice channel, and wherein the automatically transitioning occurs without any human input.

12. The communication system of claim 9, wherein the data stored on the computer memory further enables the processor to:

automatically transition the contact from the voice channel to the non-voice channel only in response to determining that the determined state of the contact center meets at least one transition criteria.

13. The communication system of claim 12, wherein the at least one transition criteria comprises a contact center key performance indicator failing to meet a predetermined threshold.

14. The communication system of claim 13, wherein the contact center key performance indicator comprises at least one of customer wait time, average time in queue, average abandonment rate, percentage of calls blocked, service level, average speed of answer, average handle time, average after call work time, first call resolution, customer satisfaction, occupancy rate, agent absenteeism, and agent turnover rate.

15. The communication system of claim 9, wherein the data stored on the computer memory further enables the processor to:

provide the customer with an expected wait time for the voice channel and an expected wait time for the non-voice channel; and present the customer with an option for transitioning from the voice channel to the non-voice channel.

16. The communication system of claim 9, wherein the automatically terminating occurs after the call has been automatically transitioned to the non-voice channel, and wherein the automatically terminating occurs without any human input.

17. A contact center, comprising:

a server comprising a processor and instructions stored in memory that are executable by the processor and that enable the processor to:

establish a voice channel with a customer communication device;

establish a non-voice channel with the customer communication device;

automatically transition a contact from the voice channel to the non-voice channel based on a determined state of the contact center thereby enabling at least one of an agent using an agent communication device and a chatbot to service a contact for a customer via the non-voice channel instead of the voice channel; and automatically terminate the voice channel after the non-voice channel has been established, after the contact has been automatically transitioned to the non-voice channel, and before the non-voice channel is terminated.

18. The contact center of claim 17, wherein the instructions, when executed by the processor, further enable the processor to:
    determine that the customer communication device is capable of supporting the non-voice channel;
    determine that the customer desires to interact via the non-voice channel instead of the voice channel; and
    transition the contact from the voice channel to the non-voice channel only in response to determining that the customer communication device is capable of supporting the non-voice channel and determining that the customer desires to interact via the non-voice channel instead of the voice channel.

19. The contact center of claim 17, wherein the customer is provided with a plurality of digital options as part of determining that the customer desires to interact via the non-voice channel instead of the voice channel, wherein the customer is provided with an estimated service time for the non-voice channel, and wherein the customer is provided with an estimated wait time for the voice channel.

20. The contact center of claim 17, wherein the instructions, when executed by the processor, further enable the processor to:
    provide self-service options for the customer with the chatbot.

* * * * *